US012763700B2

(12) United States Patent
Abdelhamid et al.

(10) Patent No.: US 12,763,700 B2
(45) Date of Patent: Oct. 13, 2026

(54) FLYING CAPACITOR BALANCING

(71) Applicant: Infineon Technologies Austria AG, Villach (AT)

(72) Inventors: Eslam Mohammed Mohammed Abdelhamid, Villach (AT); Juan Miguel Martinez Sanchez, Villach (AT)

(73) Assignee: Infineon Technologies Austria AG, Villach (AT)

( * ) Notice: Subject to any disclaimer, the term of this patent is extended or adjusted under 35 U.S.C. 154(b) by 144 days.

(21) Appl. No.: 18/929,986

(22) Filed: Oct. 29, 2024

(65) Prior Publication Data

US 2025/0141366 A1 May 1, 2025

(30) Foreign Application Priority Data

Nov. 1, 2023 (EP) .................................... 23207319

(51) Int. Cl.
*H02M 7/483* (2007.01)
*H02M 7/5395* (2006.01)

(52) U.S. Cl.
CPC ....... *H02M 7/4833* (2021.05); *H02M 7/4837* (2021.05); *H02M 7/5395* (2013.01)

(58) Field of Classification Search
CPC . H02M 7/4833; H02M 7/4837; H02M 7/5395
USPC .......................................................... 363/131
See application file for complete search history.

(56) References Cited

U.S. PATENT DOCUMENTS 8,929,114 B2 * 1/2015 Li ......................... H02M 7/487 363/130
12,395,072 B2 * 8/2025 Huber ................. H02M 1/4225
2019/0379287 A1 * 12/2019 Zhang ...................... H02M 3/07
2023/0268831 A1 * 8/2023 Zhang ................. H02M 1/0025 323/285
2025/0015718 A1 * 1/2025 Pedroso .............. H02M 1/0095

OTHER PUBLICATIONS

Da Silva Carvalho Samuel, et al. "Digital PWM for Multi-Level Flying Capacitor Converters with Improved Output Resolution and Flying Capacitor Voltage Controller Stability", 2018 IEEE 19th Workshop on Control and Modeling for Power Electronics (Compel), IEEE, Jun. 25, 2018, pp. 1-7, XP033402442.
Extended Search Report, EP 23 20 7319, Apr. 5, 2024, pp. 1-9.

(Continued)

*Primary Examiner* — Yemane Mehari
(74) *Attorney, Agent, or Firm* — Armis IP Law, LLC

(57) ABSTRACT

A method of balancing voltages on flying capacitors in a multilevel power converter is provided (along with an associated controller). The power converter includes one or more flying capacitors. Pairs of switches in the power converter are controlled by pulse width modulated (PWM) control signals. The different pairs of switches are controlled by PWM control signals having a phase/timing shift between them. To balance the voltage on the one or more flying capacitors, one set of pulses can be widened or narrowed while another set is widened or narrowed. To change their widths, one edge of each pulse is modulated, while the other edge is unchanged. More specifically, the leading edge of one set of pulses is modulated, while the trailing edge of the other set of pulses is modulated.

19 Claims, 14 Drawing Sheets

(56) References Cited

OTHER PUBLICATIONS

Rodriguez, Juan, et al., "Pulsewidth Modulated Three-Level Buck Converter Based on Stacking Switch-Cells for High Power Envelope Tracking Applications", IEEE Transactions on Power Electronics Institute of Electrical and Electronics Engineer, vol. 37, No. 5, May 2022, pp. 5786-5800, XP011898584.

* cited by examiner

FLYING CAPACITOR BALANCING

RELATED APPLICATIONS

This application claims priority to earlier filed European Patent Application Serial Number EP 2320 7319 entitled "FLYING CAPACITOR BALANCING," filed on Nov. 1, 2023, the entire teachings of which are incorporated herein by this reference.

FIELD OF THE INVENTION

This invention relates to control of a multilevel converter. In particular, it relates to balancing the voltage on one or more flying capacitors in a multilevel converter.

BACKGROUND OF THE INVENTION

Multilevel converters are attractive for applications in which high-efficiency and small size are required. A multilevel topology with N levels can enable the inductance of the converter to be reduced by a factor of $$\frac{1}{(N-1)^2}.$$

Such converters can also reduce voltage stress across switching devices by factor of $$\frac{1}{N-1}$$

compared to a conventional two-level architecture. In general, a multi-level flying capacitor converter consists of 2(N−1) switches and (N−2) interconnected flying capacitors. The 2(N−1) switches can be logically divided into (N−1) switching pairs. Each pair has two switches which are driven in a complementary fashion, and each pair is $$\frac{2\pi}{N-1}$$

out of phase from the preceding pair. For example, in the exemplary three-level converter shown in FIG. 1, the converter has one flying capacitor $C_{fly}$ and two switching pairs A and B. The switching pairs are driven 180° out of phase. Each pair of switches, A−$\overline{A}$ and B−$\overline{B}$, includes two switches, which are driven in a complementary manner.

The switches (also referred to herein as "switching elements") are typically controlled switching elements, commonly implemented as transistors. In the example of FIG. 1, the switches are metal oxide semiconductor field effect transistors (MOSFETs).

The voltage stress reduction and the ripple frequency increase (inductance reduction) is derived from the fact that the flying capacitors' voltages are balanced at $$\frac{nV_{total}}{N-1}$$

wherein n is the index of the flying capacitor, which also acts as a switching pair index, for "inner" switching pairs, which for this purpose ranges between 1 and N−2. The index n=1 refers to the innermost pair of switches (B−$\overline{B}$, in the example of FIG. 1). The index n=N−1 refers to the outermost pair of switches (A−$\overline{A}$, in the example of FIG. 1), which are coupled to the supply voltage rather than a flying capacitor. For a buck-based topology, $V_{total}=V_{in}$. For a boost-based topology, $V_{total}=V_{out}$. For a buck-boost topology, $V_{total}=V_{in}+V_{out}$.

Any voltage mismatch on the flying capacitor(s) may result in higher voltage stress and subharmonic oscillations in the inductor current. In theory, in many topologies, the interleaved operation of the switching pairs helps to provide natural balancing for the flying capacitors' (FC) voltage. However, in practice, the FC voltage is sensitive to gate drive circuitry mismatches and other circuit imperfections. Consequently, flying capacitor (FC) active balancing is desirable in such architectures.

SUMMARY

The inventors have recognised that there is a need for an improved control regime for better balancing of flying capacitor voltages.

A method of balancing voltages on flying capacitors in a multilevel power converter is provided (along with an associated controller). The power converter includes one or more flying capacitors. Pairs of switches in the power converter are controlled by pulse width modulated (PWM) control signals. The different pairs of switches are controlled by PWM control signals having a phase/timing shift between them. To balance the voltage on the one or more flying capacitors, one set of pulses can be widened or narrowed while another set is widened or narrowed. To change their widths, one edge of each pulse is modulated, while the other edge is unchanged. More specifically, the leading edge of one set of pulses is modulated, while the trailing edge of the other set of pulses is modulated.

According to an aspect, there is disclosed a method of balancing voltages on one or more flying capacitors in a multilevel power converter, the multilevel power converter comprising a plurality of pairs of switching elements in a nested arrangement, including at least a first pair of switching elements and a second pair of switching elements, wherein the first pair is an innermost pair, wherein the switching elements of the first pair are coupled together at a switching node, wherein the switching elements of the second pair are coupled to respective switching elements of the first pair, the multilevel power converter further comprising one or more flying capacitors, including at least a first flying capacitor connected across the first pair of switching elements, the method comprising:

- obtaining a duty cycle command value for driving the switching elements;
- generating, based on the duty cycle command value, a first pulse width modulated, PWM, control signal for the first pair of switching elements and a second PWM control signal for the second pair of switching elements,
  - the first PWM control signal comprising a series of first pulses at a switching frequency and the second PWM control signal comprising a series of second pulses at the switching frequency, each pulse having a start and an end,
  - wherein one switching element of the first pair is controlled by the first PWM control signal and the other switching element of the first pair is controlled by the complement of the first PWM control signal, wherein one switching element of the second pair is controlled by the second PWM control signal and the other switching element of the second pair is controlled by the complement of the second PWM control signal;

detecting a difference between a voltage on the first flying capacitor and a reference voltage for that flying capacitor; and responsive to detecting said difference, modifying a width of the first pulses, the method further comprising modifying a width of the second pulses, wherein the width of the first pulses is modified by changing a timing of the start of each first pulse, and the width of the second pulses is modified by changing a timing of the end of each second pulse, or wherein the width of the first pulses is modified by changing a timing of the end of each first pulse, and the width of the second pulses is modified by changing a timing of the start of each second pulse.

Balancing the capacitor voltage by changing alternate edges of the PWM pulses may help to ensure stability of the system.

In some cases, the width of the second pulses may be modified to balance the voltage on a second flying capacitor. The second flying capacitor may be coupled across the second pair of switching elements. In this case, the second pulses and the first pulses may be modified in the same sense or in different senses, depending on the voltages on the first and second flying capacitors.

In one case, the width of the second pulses may be modified to balance the voltage on the first flying capacitor. In this case, the method may comprise, responsive to detecting said difference, modifying a width of the first pulses in one sense and modifying a width of the second pulses in the opposite sense. This case applies to a three-level power converter, for example. By modifying the widths of both the first pulses and the second pulses, the method may facilitate faster balancing of the the voltage on the first flying capacitor.

Here "one sense" and "the opposite sense" means that the width of one set of pulses is increased while the width of the other set of pulses is decreased. Whether to increase or decrease the width of the first pulses depends on the whether the voltage on the first flying capacitor is higher or lower than the reference voltage. It also depends on which of the switching elements are controlled by the PWM signals and which are controlled by their complements. By widening the pulses of one PWM control signal and narrowing the pulses of the other PWM control signal correspondingly, the average duty cycle can be maintained, while correcting the voltage on the flying capacitor.

The PWM control signals may be generated in an interleaved fashion. Under some conditions (related to the voltage conversion ratio of the converter), the first pulses might not overlap with the second pulses. Under other conditions the first pulses and second pulses may overlap.

When modifying the widths of the pulses, the pulses that are widened may be widened by a first amount; and the pulses that are narrowed may be narrowed by a second amount. The first amount may be identical to the second amount. The timing of the end of each first pulse relative to the start of each second pulse may remain unchanged. This can help to ensure stability over a wider range of load conditions.

The first PWM control signal and the second PWM control signal may be generated to have a predetermined time or phase shift between them (in particular, in steady state when the one or more flying capacitors are balanced).

Depending on the topology of the power converter, the switching node mentioned above may be configured to deliver a load current to a load. In other topologies, the switching node may be configured to be coupled to a supply voltage.

The width of the first pulses may be modified by changing a timing of the start of each first pulse, and the width of the second pulses may be modified by changing a timing of the end of each second pulse, wherein, when modifying the width of the first pulses and the second pulses, a time interval between the start of a first pulse and the end of a second pulse is optionally held constant.

The width of the first pulses may be modified by changing a timing of the end of each first pulse, and the width of the second pulses may be modified by changing a timing of the start of each second pulse, wherein, when modifying the width of the first pulses and the second pulses, a time interval between the end of a first pulse and the start of a second pulse is optionally held constant.

In particular, the above conditions may hold between each first pulse and its adjacent second pulse.

The first PWM control signal may be generated from a first carrier wave and the second PWM control signal may be generated from a second carrier wave, wherein one of the first carrier wave and the second carrier wave is a ramp-up sawtooth function with a sharp trailing edge, and the other is a ramp-down sawtooth function with a sharp leading edge. The PWM control signals may be generated by comparing the respective carrier waves with a threshold. The threshold may be based on the duty cycle command value.

A timing of the first carrier wave may be set based on a timing of a carrier wave for generating a PWM control signal for an outermost pair of switching elements among the plurality of pairs of switching elements.

The multilevel power converter may be configured for N levels, and the plurality of pairs of switching elements may consist of N−1 pairs of switching elements, the method optionally comprising generating a PWM control signal for each pair of switching elements based on a respective carrier wave comprising a sawtooth function, wherein the sawtooth functions alternate between ramp-up sawtooth functions and ramp-down sawtooth functions.

The alternating may be considered in a sequence starting from the innermost pair of switching elements and ending with the outermost pair of switching elements in the nested arrangement. Likewise, it may be considered in a sequence going in the opposite direction—from the outermost pair to the innermost pair. On either interpretation, the alternating defined is the same. Each succeeding pair of switching elements inside (or outside) its preceding pair is controlled in the opposite way to the preceding pair. Thus, consecutive switching elements are controlled in opposite ways (using opposite edges of the respective PWM pulses).

The innermost pair of switching elements may be numbered n=1; the outermost pair of switching elements (which is not associated with a flying capacitor) may be numbered n=N−1.

The PWM control signals may be generated by comparing the sawtooth functions with one or more thresholds. Each pulse may correspond to a time period when the sawtooth function is below the respective threshold.

In some examples, the odd numbered pairs of switching elements may be controlled based on ramp-down sawtooth functions. That is, the PWM control signals for the first (innermost), third, fifth, etc. pairs may be generated based on ramp-down sawtooth functions with sharp leading edges. The even numbered pairs of switching elements may be controlled based on ramp-up sawtooth functions That is, the PWM control signals for the second, fourth, sixth, etc. pairs may be generated based on ramp-up sawtooth functions with sharp trailing edges.

In other examples, the odd numbered pairs of switching elements may be controlled based on ramp-up sawtooth functions. That is, the PWM control signals for the first (innermost), third, fifth, etc. pairs may be generated based on ramp-up sawtooth functions with sharp trailing edges. The even numbered pairs of switching elements may be controlled based on ramp-down sawtooth functions That is, the PWM control signals for the second, fourth, sixth, etc. pairs may be generated based on ramp-down sawtooth functions with sharp leading edges.

A timing delay between the PWM control signals for consecutive pairs of switching elements may be equal to $$\frac{1}{f_s(N-1)},$$

where $f_s$ is the switching frequency.

A timing delay of a trailing edge of each ramp-up sawtooth function may be set equal to:

$$t_{r_n-trailing} = \frac{1}{f_s}\left(1 - \frac{n}{N-1}\right),$$

where n is the index of the pair of switching elements. The timing delay may be set relative to an edge of the carrier wave for the outermost pair of switching elements—in particular, a trailing edge of a ramp-up sawtooth function for the outermost pair.

A timing delay of the leading edge of each ramp-down sawtooth function may be set equal to:

$$t_{r_n-leading} = \begin{cases} \frac{1}{f_s}\left(d + 1 - \frac{n}{N-1}\right): d \le \frac{n}{N-1} \\ \frac{1}{f_s}\left(d - \frac{n}{N-1}\right): d > \frac{n}{N-1} \end{cases},$$

where n is the index of the pair of switching elements and d is the duty cycle command value.

Again, this timing delay may be set relative to an edge of the carrier wave for the outermost pair of switching elements—in particular, a trailing edge of a ramp-up sawtooth function for the outermost pair.

A leading edge or trailing edge of one carrier may be triggered by another carrier reaching a threshold.

In some examples, the plurality of pairs of switching elements may consist of two pairs, wherein the second pair of switching elements is the outermost pair. In this case, the timing of the first carrier wave (used to generate the first PWM control signal for the inner pair of switching elements) may be set based on the second carrier wave (used to generate the second PWM control signal for the outer pair of switching elements).

In particular, the first PWM control signal may be generated such that a time interval between the start of a second pulse and the end of a first pulse is determined by the duty cycle command value plus or minus a predetermined offset.

According to some examples, a reset of the first carrier (determining an end of a first pulse) may be triggered by the second carrier reaching a threshold. The threshold may depend on the duty cycle command value. In particular, the threshold may be determined by the duty cycle command value plus or minus a predetermined offset.

In some examples, the plurality of pairs of switching elements comprises three or more pairs, and the one or more flying capacitors further include a second flying capacitor connected across the second pair of switching elements, wherein the second pair of switching elements is the next-innermost pair after the first pair.

Also provided is a controller for a multilevel flying capacitor power converter comprising a plurality of pairs of switching elements in a nested arrangement, including at least a first pair of switching elements and a second pair of switching elements, wherein the first pair is an innermost pair, wherein the switching elements of the first pair are coupled together at a switching node, wherein the switching elements of the second pair are coupled to respective switching elements of the first pair, the multilevel power converter further comprising one or more flying capacitors, including at least a first flying capacitor connected across the first pair of switching elements, the controller comprising:

first control logic configured to calculate a duty cycle command value for driving the switching elements; and second control logic configured to generate, based on the duty cycle command value, a first pulse width modulated, PWM, control signal for the first pair of switching elements and a second PWM control signal for the second pair of switching elements, the first PWM control signal comprising a series of first pulses at a switching frequency and the second PWM control signal comprising a series of second pulses at the switching frequency, each pulse having a start and an end, wherein one switching element of the first pair is controlled by the first PWM control signal and the other switching element of the first pair is controlled by the complement of the first PWM control signal, wherein one switching element of the second pair is controlled by the second PWM control signal and the other switching element of the second pair is controlled by the complement of the second PWM control signal, wherein the second control logic comprises voltage balancing logic configured to detect a difference between a voltage on the first flying capacitor and a reference voltage for that flying capacitor; and responsive to detecting said difference, to modify a width of the first pulses, wherein the voltage balancing logic is further configured to modify a width of the second pulses, wherein the width of the first pulses is modified by changing a timing of the start of each first pulse, and the width of the second pulses is modified by changing a timing of the end of each second pulse, or wherein the width of the first pulses is modified by changing a timing of the end of each first pulse, and the width of the second pulses is modified by changing a timing of the start of each second pulse.

The voltage balancing logic may be configured to modify the timing of each pulse by an amount that is proportional to the difference between the voltage on the first flying capacitor and the reference voltage for that flying capacitor.

Also provided is a multilevel power converter comprising a controller as summarised above. The multilevel converter may be used to supply a power amplifier in a mobile communications network. For example, a multilevel power converter according to the present disclosure may be integrated in a mobile communications base station to supply power to a power amplifier for transmitting a downlink signal to user equipment. The base station may be a 5G base station, for example.

Also provided is computer program code configured to cause a programmable controller for a multilevel power converter to perform a method as summarized above when the code is run on said programmable controller. The computer program code may be stored on a computer readable medium (optionally non-transitory).

BRIEF DESCRIPTION OF THE DRAWINGS

The invention will now be described by way of example with reference to the accompanying drawings, in which.

Figure 1:
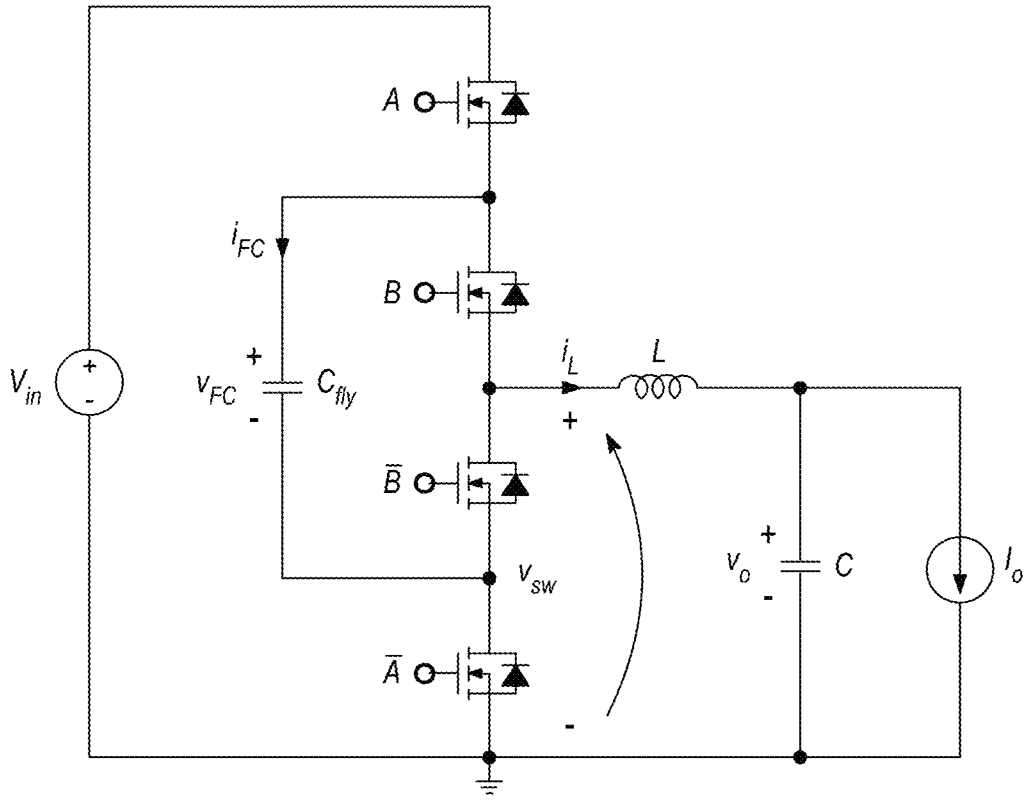
FIG. 1 is a circuit diagram of a three-level converter with a buck topology, having one flying capacitor.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Figure 2:
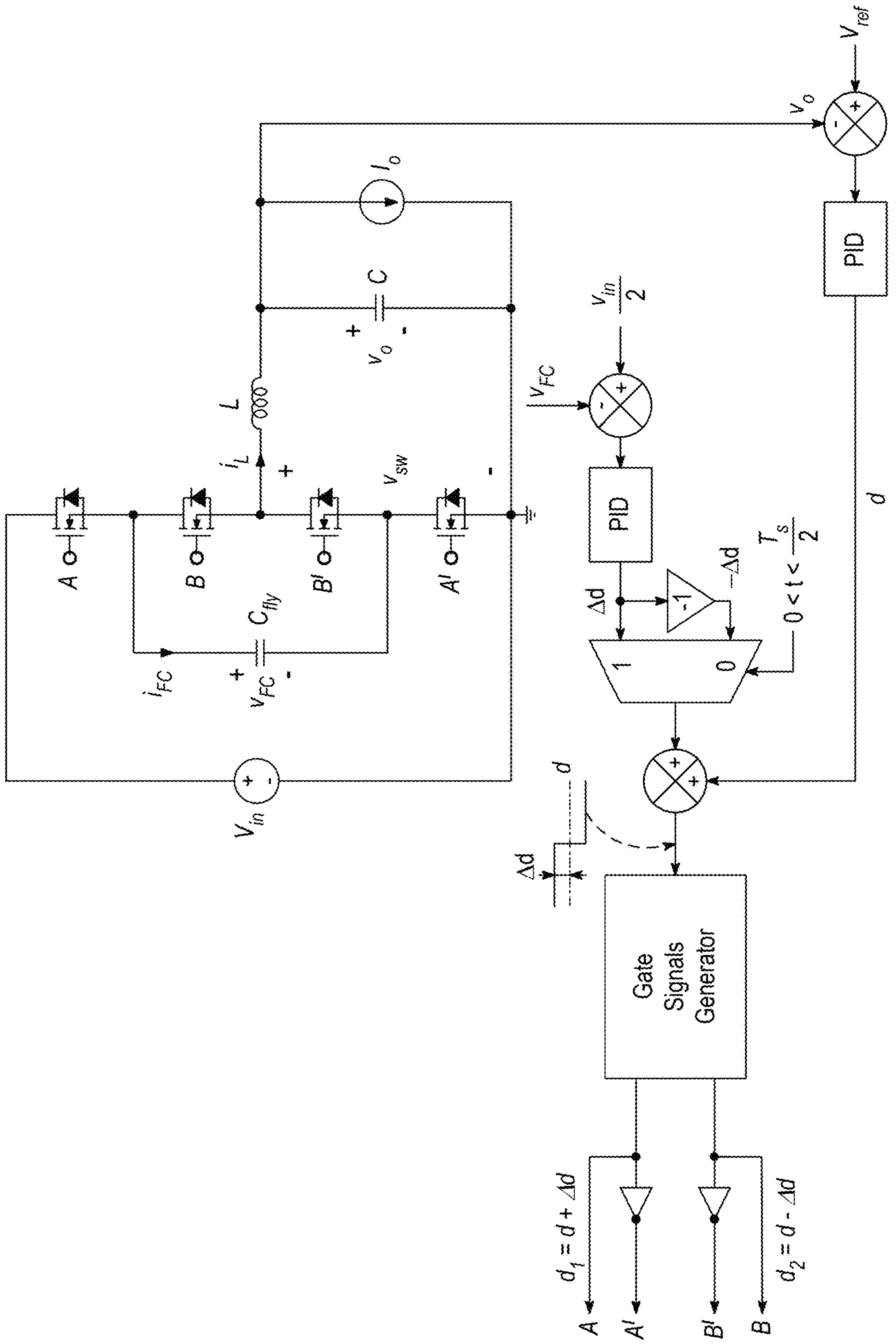
FIG. 2 illustrates a control scheme for converter of FIG. 1, according to a comparative example.

A control scheme according to a comparative example is illustrated in FIG. 2. This control scheme seeks to balance the flying capacitor voltage—that is, maintain it as close as possible to the nominal target voltage of $$\frac{nV_{total}}{N-1}.$$

For the three-level buck converter of FIG. 1, the nominal target FC voltage is $$\frac{V_{in}}{2}.$$

In the example of FIG. 1, the target output voltage of the converter is $V_{ref}$. Closed loop feedback is used to deliver this output voltage. In particular, the measured output voltage $v_o$ is subtracted from $V_{ref}$ to produce a voltage difference. This is processed by a proportional-integral-derivative (PID) controller to produce a duty cycle command value d. This value d controls the duty cycle of pulse width modulated (PWM) control signals generated by the gate signals generator.

The error in the FC voltage (that is, the deviation from $$\left.\frac{V_{in}}{2}\right)$$

is used to change the duty cycle command value by Δd. The duty correction Δd modifies the original duty reference (d) which is set by the output voltage regulation loop. The duty correction is applied within the same switching cycle differently to the two switching pairs in order to keep the average duty cycle unchanged, and at the same time provide a negative feedback action on the FC voltage.

However, it has been found that the feedback sign of the scheme shown in FIG. 2 is not always negative. The stability of this control scheme may depend on the load current. For example, the architecture shown in FIG. 2 may have stability problems under light load conditions—in particular, when applying a single-edge PWM modulation scheme. It may be possible to solve these stability problems by applying dual-edge modulation. However, the dual-edge modulator suffers from reduced resolution compared with the single-edge modulator.

Examples according to the present disclosure may address the stability problems of the comparative example in FIG. 2, and provide reliable, load-independent FC voltage balancing with high resolution. This may be achieved without a significant increase in the complexity of the controller circuitry, without introducing jitter, and without the need for complicated modifications such as oversampling an inductor current to detect and measure valley points.

Figure 3:
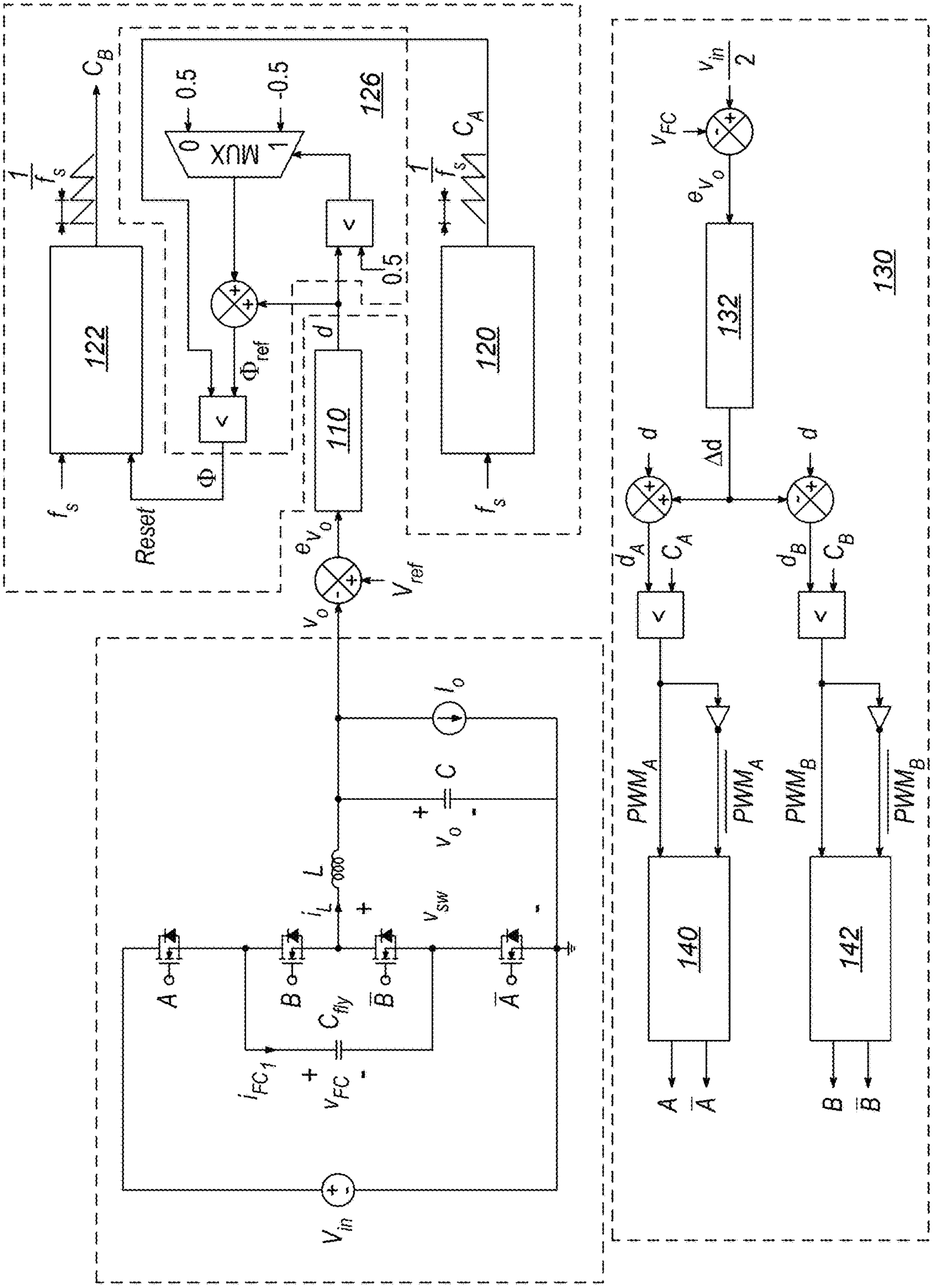
FIG. 3 is a circuit diagram illustrating flying-capacitor voltage-balancing according to an example.
Figure 4A:
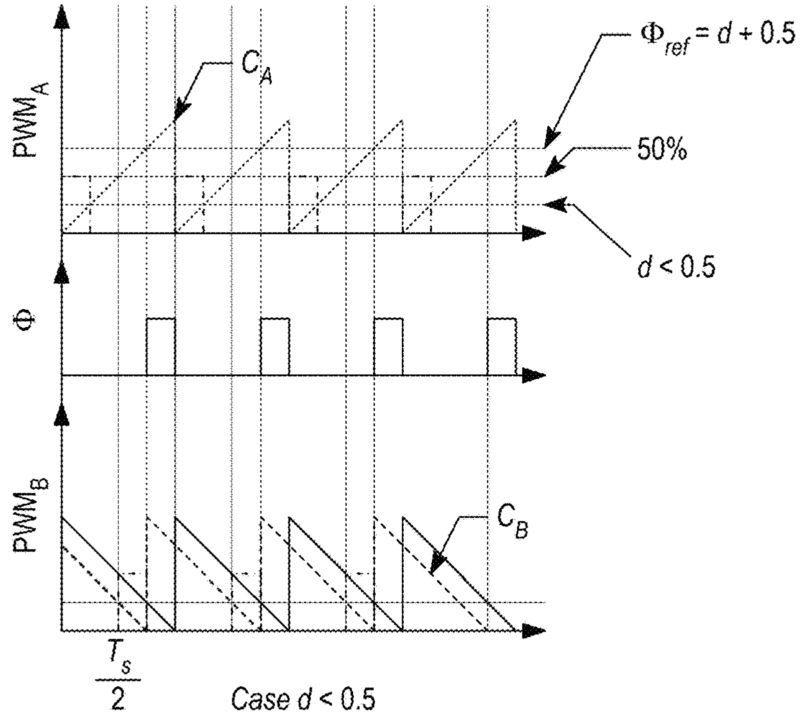
FIG. 4A shows the control signals generated in circuit of FIG. 3 when the duty cycle is less than 50%.

FIG. 3 shows an example of FC voltage balancing according to the present disclosure. FIGS. 4A an 4B show the control signals generated in the circuit of FIG. 3. For ease of explanation, this example is based on the three-level buck converter of FIG. 1. However, it should be understood that the scope of the present disclosure is limited neither to buck converters nor to three-level converters. Multilevel flying capacitor topologies can be applied to power converters of various types. The principles disclosed here are applicable to any type of flying capacitor converter, irrespective of the specific topology or number of levels.

In order to generate the PWM signals for the switching pairs in this example, an interleaving mechanism is used. Interleaved PWM signals can be generated from interleaved carrier signals ($C_n$), which are then compared with the duty reference signal d. However, this is merely exemplary. It should be understood that using interleaved carriers is not the only way of generating the desired interleaved angle/time.

It is believed that the instability in the single-edge modulator arises because the PWM control signals of all switching pairs are modulated from the same edge—that is the leading edge (start) of each pulse is modulated, or the trailing edge (end) of each pulse is modulated. As a result, the inductor current has two different feedback actions on the flying capacitors voltages. The DC current component has a negative feedback action while the inductor current ripple has a positive feedback action. At the load condition when the ripple current has a dominant effect over the DC component then the positive feedback action takes precedence-thereby leading to instability.

Referring to FIG. 3, control logic 110 generates the duty cycle command value d, based on an error (difference) between the output voltage and the reference output voltage of the converter. Two carrier generators 120 and 122 then generate carrier signals from which the PWM control signals for the switches can be derived. The relationship between the two carriers depends on the value d.

In the illustrated three-level architecture, two PWM signals with a phase shift of 180° between them are used to modulate two switching pairs ($A$–$\overline{A}$) and ($B$–$\overline{B}$). The proposed technique uses two different carriers to generate these PWM signals. A trailing edge carrier generator 120 produces the carrier $C_A$ with a fixed frequency $f_s$. The trailing edge carrier is a ramp-up sawtooth wave with a sharp transition to zero at its trailing edge. For the carrier $C_B$, a leading edge carrier generator 122 is used. The leading edge carrier is a ramp-down sawtooth wave with a sharp transition from zero at its leading edge. The leading edge carrier generator 122 has a reset signal provided from the Φ generator block.

The Φ generator block 126 works in two modes, as follows. If the duty cycle d provided by the output voltage (or inductor current) control loop is lower than 50%, then the reset signal is generated at the compare match event between carrier $C_A$ and the reference value d+0.5. In other words, the reset signal is generated when the rising ramp of the carrier $C_A$ becomes equal to (or greater than) the reference value d+0.5. In the other mode, if the duty command d is higher than 50%, then the reset signal is generated at the compare-match with the reference value d–0.5.

The carriers $C_A$ and $C_B$ are provided to a flying capacitor voltage balancing loop 130, along with a measurement of the flying capacitor voltage $V_{FC}$. The flying capacitor voltage is subtracted from the nominal target FC voltage $$\frac{V_{in}}{2}.$$

The resulting error is fed into a PID controller 132, which generates a duty correction Δd proportional to the error.

This duty correction is used to modulate the duty cycle command value d. In particular, for the innermost pair of switches ($B$–$\overline{B}$), the duty correction Δd is subtracted from the duty cycle command value d. The PWM control signal $PWM_B$ for the pair of switches ($B$–$\overline{B}$) is generated by comparing the carrier $C_B$ with the resulting modulated duty cycle value $d_B$. This means that, for positive values of the duty correction Δd, the start of each pulse in $PWM_B$ is delayed (narrowing the pulse). For negative values of the duty correction, the start of each pulse in $PWM_B$ is advanced (widening the pulse). In both cases, the end of each pulse in $PWM_B$ is unchanged. Note that the edges of the pulses in the two PWM control signals $PWM_A$ and $PWM_B$ are modified by the same amount (though in opposite directions).

For the outermost pair of switches ($A$–$\overline{A}$), The duty correction is added to the duty cycle command value d. The PWM control signal $PWM_A$ for the pair of switches ($A$–$\overline{A}$) is generated by comparing the carrier $C_A$ with the resulting modulated duty cycle value $d_A$. This means that, for positive values of the duty correction Δd, the end of each pulse in $PWM_A$ is delayed (widening the pulse). For negative values of the duty correction, the end of each pulse in $PWM_A$ is advanced (narrowing the pulse). In both cases, the start of each pulse in $PWM_A$ is unchanged.

This enables the desired balancing to be achieved. When the FC voltage is higher than the reference, the width of the pulse controlling the switch A is reduced and the width of the pulse controlling the switch B is increased. This allows the flying capacitor to discharge for a slightly longer period and charge for a slightly shorter period, thereby causing a net reduction in its voltage. Conversely, when the FC voltage is lower than the reference, the width of the pulse controlling the switch A is increased and the width of the pulse controlling the switch B is decreased. This allows the flying capacitor to charge for a slightly longer period and discharge for a slightly shorter period, thereby causing a net increase in its voltage. Note that the pulse widths are changed by modulating opposite edges of the pulses in $PWM_A$ and $PWM_B$.

Modifying the pulse-widths of the PWM control signals $PWM_A$ and $PWM_B$ in opposite senses can help to balance the flying capacity voltage faster, while maintaining stability and the same average duty cycle command value—at least in the three-level case. In principle, modifying the pulses of just one of these control signals would be enough to begin to balance the flying capacitor voltage, and correction of the overall duty cycle could be left to the control logic 110. For multilevel converters having more than three levels, the symmetrical modification of pulse-widths is optional. In general, the flying capacitors in such converters may be balanced by adjusting the pulses of one PWM control per flying capacitor.

Returning to the three-level example of FIG. 3, the PWM control signal $PWM_A$ for the outermost pair of switches ($A$–$\overline{A}$) is provided to a gate driver circuit 140, for driving the gate of one switch of the pair. The complement of the PWM control signal $PWM_A$ is also provided to the gate driver circuit 140, for driving the other switch of the pair. Similarly, the PWM control signal $PWM_B$ for the innermost pair of switches ($B$–$\overline{B}$) is provided to a gate driver circuit 142, for driving the gate of one switch of the pair. The complement of the PWM control signal $PWM_B$ is also provided to the gate driver circuit 142, for driving the other switch of the pair.

Figure 4B:
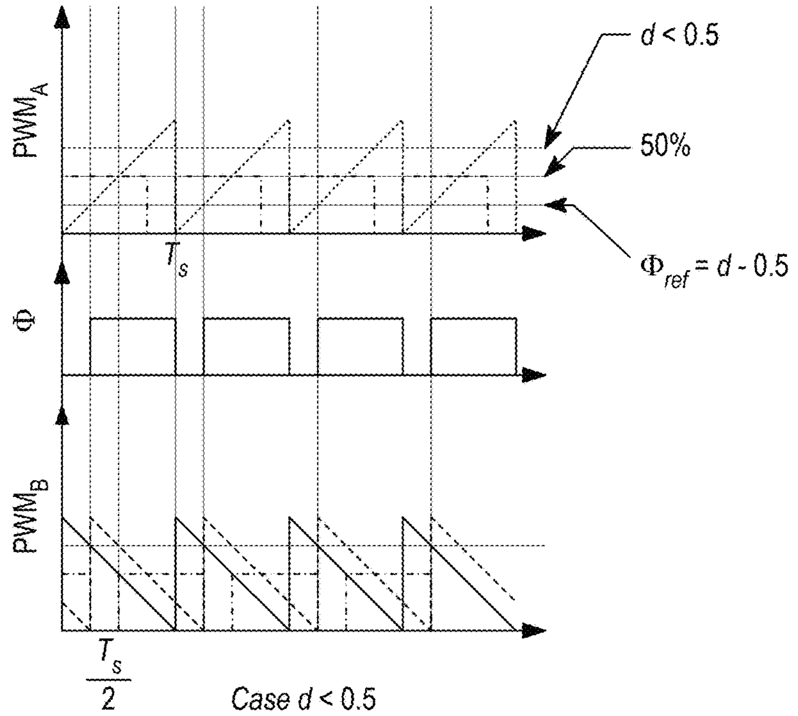
FIG. 4B shows the control signals generated in circuit of FIG. 3 when the duty cycle is greater than 50%.

Waveforms for the two operating modes (depending on the duty cycle command value d) are shown in FIGS. 4A and 4B, respectively. As shown, in the PWM control signal ($PWM_A$) for the outermost pair of switches ($A$–$\overline{A}$), the pulses start on the sharp trailing edge of the carrier $C_A$. The pulses end when the rising ramp of the carrier $C_A$ becomes equal to (or greater than) the duty cycle command value d. Meanwhile, in the PWM control signal ($PWM_B$) for the innermost pair of switches ($B$–$\overline{B}$), the pulses start when the falling ramp of the carrier $C_B$ becomes equal to (or less than) the duty cycle command value d. The pulses end at the sharp leading edge of the carrier $C_B$.

In FIG. 4A, where the duty cycle value d is less than 50%, the leading edge of the carrier $C_B$ is triggered when the rising ramp of the carrier $C_A$ becomes equal to (or greater than) the reference value d+0.5. This ensures that the time interval between the start of a pulse in $PWM_A$ and the end of a pulse in $PWM_B$ is equal to the duty cycle plus half the switching period ($1/f_s$). When no balancing of the flying capacitor is taking place—that is, in the steady-state balanced condition—this will mean that the pulses in $PWM_B$ start and end half a switching period after the start and end, respectively, of the pulses in $PWM_A$. A similar 180° phase relationship is produced according to FIG. 4B, when the duty cycle value d is greater than 50%. However, in the case of FIG. 4B, the pulses in $PWM_A$ and $PWM_B$ overlap. In other words, the pulses are interleaved such that, at steady state, the start of each pulse in $PWM_B$ is shifted by 180° from the start of the respective pulse in $PWM_A$. This is the case in both modes d<0.5 or d>0.5. Therefore, even if the two PWM signals are overlapped in the mode d>0.5, still the start of $PWM_B$ is shifted by a half-period from the start of $PWM_A$.

The control scheme described above has been shown to achieve successful balancing of flying capacitor voltages at light and heavy loads. The instability observed with the comparative example of FIG. 2 is eliminated.

Figure 5:
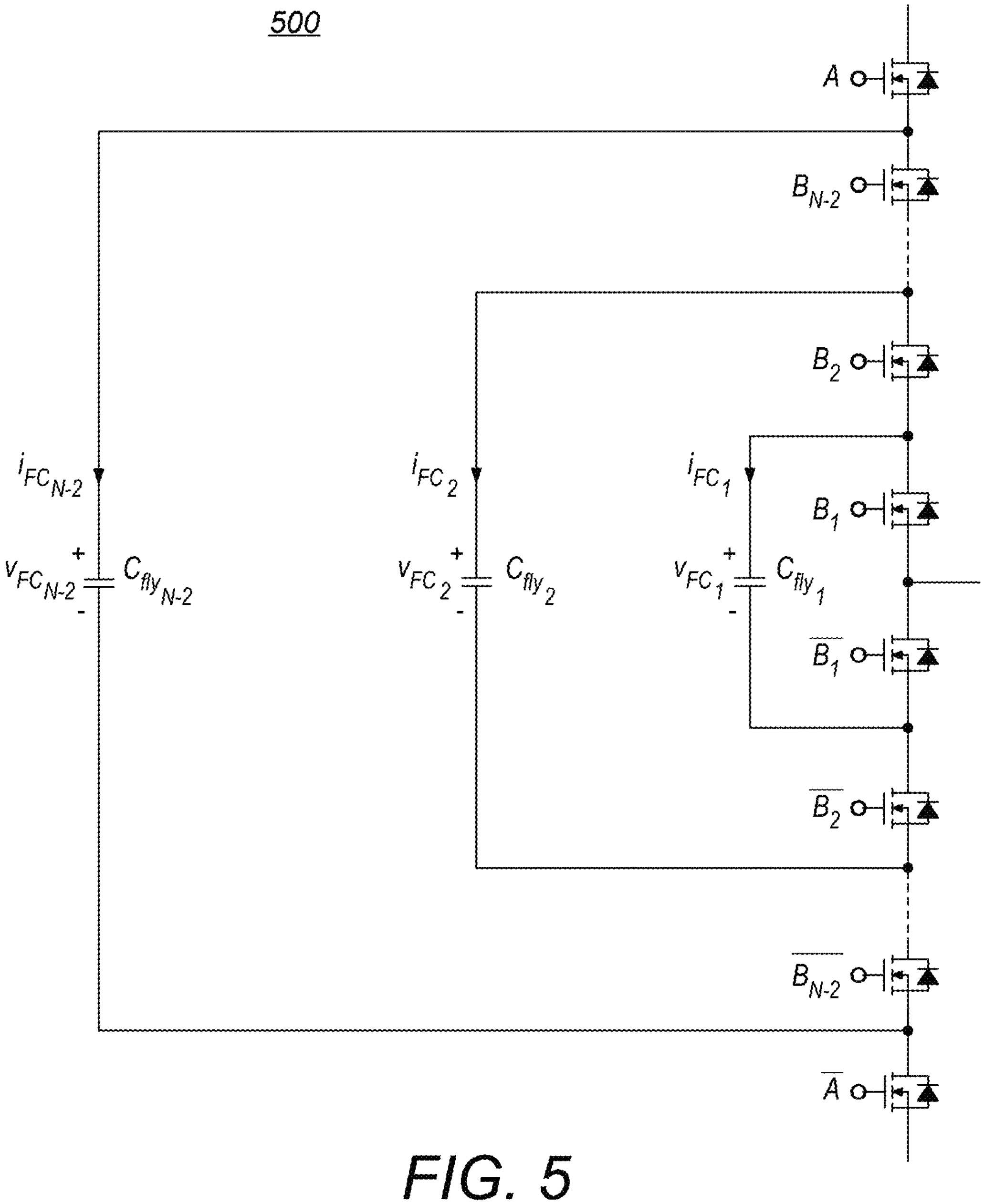
FIG. 5 is a circuit diagram of a generalised multilevel converter.

A general N-level flying capacitor switching pairs architecture 500 is shown in FIG. 5. This extends the architecture shown in FIG. 3 to more than three levels. There are (N−1) switching pairs. Starting with the innermost pair $B_1$ to the switching pair $B_{N-2}$, and ending with the outermost switching pair A. Each pair has two switching elements $B_n$–$\overline{B_n}$ where n is the index of the switching pair, from 1 to (N−2). The outermost switching pair has two switching elements A–$\overline{A}$. Therefore, in total there are 2(N−1) active switching elements. Each inner switching pair $B_n$–$\overline{B_n}$ has a flying capacitor $C_{fly_n}$ connected across the switching elements, starting with the $C_{fly_1}$ connected to the innermost pair and ending with $C_{fly_{N-2}}$ connected to the switching pair $B_{N-2}$, as shown in FIG. 5. In total, the N-level converter has (N−2) flying capacitors. As shown, from the outermost pair to the innermost switching pair, each pair is connected to the previous one, except that the innermost pair $B_1$ has a common node which will be connected to other system components (for example, to an inductor, in a buck converter). From the innermost to the outermost pair, each pair is connected to the next switching pair except the outermost pair has terminals that will be connected to other system components (for example, to the supply voltage).

The details of the multilevel architecture beyond those shown in FIG. 5 is outside the scope of the present disclosure. However, FIG. 5 shows the portion of the architecture that is relevant for understanding the present disclosure. As noted already above, the scope of application of the proposed control architecture is not limited to any specific multilevel converter architecture; it is valid for substantially any multilevel flying capacitor converter topology (buck, boost, buck-boost, etc.).

As shown in FIG. 5, the exemplary N-level converter has (N−2) flying capacitors to balance, and (for example) one output voltage and one inductor current to control. (The output voltage and inductor current are not shown in the generalized architecture of FIG. 5, but they are typical for the majority of power converter topologies.) Moreover, the N-levels converter requires (N−1) PWM control signals to operate the switching pairs. Examples according to the present disclosure use leading-edge and trailing-edge carriers-based modulators together to generate the PWM signals with a consistently negative feedback sign that eliminates the stability dependency on the load currents in the multilevel converter.

Figure 6:
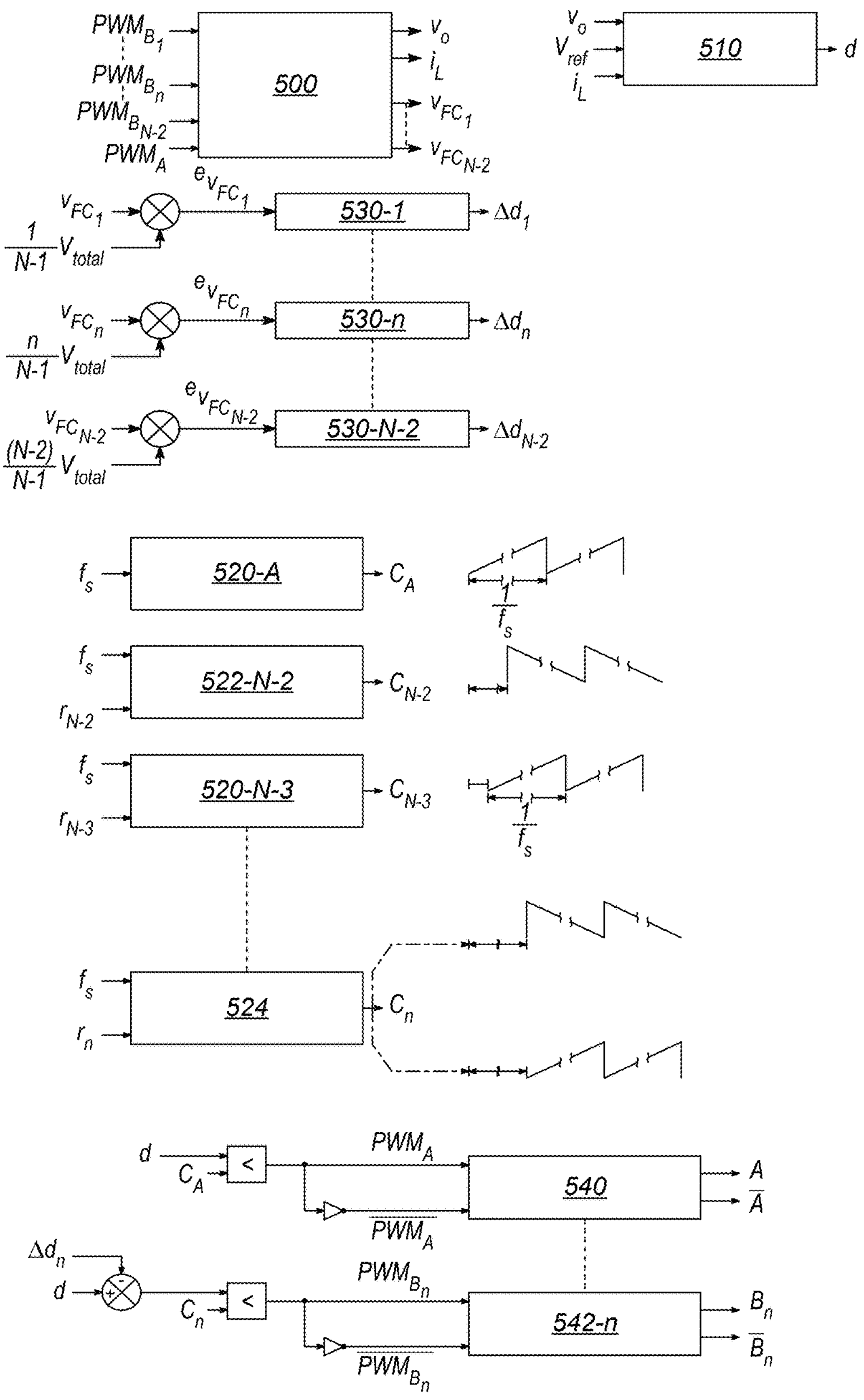
FIG. 6 illustrates flying capacitor voltage balancing for the generalised multilevel converter of FIG. 5.

FIG. 6 shows a block diagram for an N-level converter 500 of the kind shown in FIG. 5, using a control scheme according example of the present disclosure. Output voltage controller block 510 could be any controller type that controls the output voltage $v_o$ or a multi-loop controller that controls output voltage and other converter parameters, such as inductor current $i_L$. The inputs to the output voltage controller block 510 are the output voltage, reference output voltage, and inductor current ($v_o$, $V_{ref}$, and $i_L$, respectively). These input are typical for a control scheme with dual loops which control output voltage and inductor current. However, it should be understood that the scope of the present disclosure is not limited to this type of output voltage controller block. The output voltage controller block 510 provides a duty cycle command value d. Additional control logic is provided to balance the flying capacitor voltages. The N-level converter has up to N−2 controllers 530-1 to 530-N−2 to balance the flying capacitor voltages. Generally, the controller 530-*n* controls $C_{fly_n}$, where n is an index in the range 1≤n≤(N−2). The error in the FC voltage is detected (noting that the present disclosure is not limited as to the method of detecting or measuring the FC voltage). The controller 530-*n* processes the error and generates a duty correction $\Delta d_n$. Later, that correction is subtracted from the original duty cycle command value d that has been generated by the output voltage controller block 510. The corrected duty cycle is compared to a carrier reference to generate the necessary PWM signals to operate the switches of the converter. The present example uses a combination of leading-edge and trailing edge carriers to generate the carrier signals $C_A$–$C_n$, where n is an index that changes in the range 1≤n≤(N−2), to generate the required (N−1) PWM signals required to operate the converter's switches. As shown in FIG. 6, the carrier signal $C_A$ is generated by the block 520-A as a trailing edge carrier (that is, a ramp-up sawtooth function). However, the disclosed balancing control scheme would also be valid if the carrier $C_A$ were a leading edge carrier (that is, a ramp-down sawtooth function). As shown, the carrier signal for the next switching pair $C_{N-2}$ is generated by the block 522-N−2 as a leading edge carrier, and the carriers continue to alternate between trailing edge carriers (e.g. carrier generator block 520-N−3) and leading edge carriers as the index n changes, one after another, until the carrier $C_1$ for the innermost pair is reached. This will be a leading edge carrier if the number of levels N is an odd number and the reference carrier $C_A$ of the outermost pair A was a trailing edge carrier. On the other hand, $C_1$ will be a trailing edge carrier if the number of levels N is an even number and the reference carrier $C_A$ of the outermost pair A was a trailing edge carrier. Again, however, it should be understood that scope of the present disclosure is not limited to this combination of carriers. These are used for the purposes of explanation; however, in general other combinations may also achieve the stability of the system.

Block 524 denotes a generalised carrier generator, which can generate either a leading edge carrier or a trailing edge carrier, as appropriate.

Ultimately, the control scheme provides (N−1) PWM signals which will be used to generate 2(N−1) gate driving signals required to operates the converter's switches. Typically, for the operation of an N-level flying capacitor converter, PWM signals are interleaved with angle of $$2\pi\frac{1}{N-1}$$

between every two consecutive PWM signals. This can be represented as a time shift $$\frac{1}{f_s(N-1)}$$

for a converter operating with switching frequency of $f_s$. To achieve this for the N-level converter case shown in FIGS. 5 and 6, the carrier signals are generated with a certain delay time with respect to the carrier signal $C_A$. Once again, it should be understood that this does not limit the scope of the present disclosure. Any other methodology that combines leading and trailing edge carriers and achieves the $$\frac{1}{f_s(N-1)}$$

delay between every two consecutive PWM signals could also be used. In the present example, the carrier signal $C_A$ for the outermost switching pair is generated as a trailing-edge carrier with a switching frequency of $f_s$. For the other switching pairs, the carriers $C_n$ alternate between leading and trailing edge carriers in sequence. Again, here n is an integer index ranging from 1 to (N−2).

As shown in FIG. 6, since the carrier $C_A$ is generated as a trailing edge carrier, the next carrier $C_{N-2}$ is generated as a leading edge carrier, followed next by the trailing edge carrier $C_{N-3}$. Here, "next" denotes moving inwards from the outermost switching pair toward the innermost switching pair. Accordingly, for a converter with an odd number of levels N, the carrier $C_1$ for the innermost switching pair will be a leading edge carrier. On the other hand, for a converter with even number of levels N, the carrier $C_1$ will be a trailing edge carrier. Generally speaking, with the aforementioned arrangement, for any trailing edge carrier $C_n$, the time delay relative to the reference/outermost carrier $C_A$ is given by:

$$t_{r_n-trailing} = \frac{1}{f_s}\left(1 - \frac{n}{N-1}\right)$$

Meanwhile, the time delay for each leading edge carrier delay depends on the value of the duty cycle and is given by:

$$t_{r_n-leading} = \begin{cases} \frac{1}{f_s}\left(d + 1 - \frac{n}{N-1}\right);\ d \le \frac{n}{N-1} \\ \frac{1}{f_s}\left(d - \frac{n}{N-1}\right);\ d > \frac{n}{N-1} \end{cases}$$

Synchronizing the reset signal of the carrier generators with the required delay, shown in $t_{r_n\text{-trailing}}$ and $t_{r_n\text{-leading}}$ leads to the desired interleaving time between the carriers resulting in the $$\frac{1}{f_s(N-1)}$$

delay between every two consecutive PWM signals.

The equations above describing $t_{r_n}$ are valid for the case shown in FIG. 6; however, it should be understood that they do not necessarily limit the scope of the present disclosure. In alternative examples, other equations or arrangements may be used that lead to the $$\frac{1}{f_s(N-1)}$$

delay between every two consecutive PWM signals.

The PWM control signal $PWM_A$ for the outermost pair of switching elements is generated by comparing the duty cycle command value d with the carrier $C_A$. The control signal $PWM_A$ is supplied to a gate driver circuit 540 for the outermost pair of switching elements A–$\overline{A}$. The complement of the control signal $PWM_A$ is generated by an inverter and is also supplied to the gate driver circuit 540.

To generate the PWM control signals $PWM_{B_n}$ for the inner pairs of switching elements, the associated duty correction $\Delta d_n$ is first subtracted from the duty cycle command value d. The resulting modulated duty cycle value is then compared with the relevant carrier $C_n$, to generate the PWM control signal $PWM_{B_n}$. The control signal $PWM_{B_n}$ is supplied to a gate driver circuit 542-*n* for the relevant pair of switching elements $B_n$–$\overline{B_n}$. The complement of the control signal $PWM_{B_n}$ is generated by an inverter and is also supplied to the gate driver circuit 542-*n*.

It is sufficient for balancing of the flying capacitor voltages to subtract the associated duty correction $\Delta d_n$ from the duty cycle command value, when generating the respective PWM control signal $PWM_{B_n}$. Optionally, compensating duty corrections could be added elsewhere, in order to speed up the balancing, when an imbalance arises. However, this is not necessary in general. It may be more straightforward to treat each capacitor and the corresponding PWM control signal separately—this is the approach taken in the present generalized example, for simplicity.

As an example of how to generate the reset signals for the leading edge modulators, additional compare units may be added to the $PWM_A$ generator; however, it should be understood that the scope of the present disclosure is not limited in this respect. The reset signal may be generated in other ways. For example, the additional compare units may be distributed among all the trailing edge carrier generators, wherein each trailing edge carrier generator generates the reset signal for the previous (or the subsequent) leading edge carrier generator. The additional compare units compare the carrier of the trailing edge modulator (in this example, the $PWM_A$ carrier) with references values $r_n = t_{r_n\text{-leading}} f_s$. By way of example, timing diagrams for the four-level case and five-level case are shown in FIGS. 7 and 8, respectively.

In some examples, an N-level converter may have N−1 operating modes depending on the duty cycle value. Thus, a three-level converter has two operating mode (d<0.5, d>0.5), as already described above for the example of FIG. 3. A four-levels converter has three operating modes $$\left(0 < d < \frac{1}{3}, \frac{1}{3} < d < \frac{2}{3}, \frac{2}{3} < d < 1\right).$$

Similarly, for five levels there are four operating modes, divided by the duty-cycle thresholds of 0.25, 0.5, and 0.75.

In line with the description earlier above, in a 4-level converter, there are three carriers: $C_A$, $C_1$, and $C_2$. The carriers $C_A$ and $C_1$ (for the outermost and innermost pairs of switching elements, respectively) are trailing edge carriers. The carrier $C_1$ has a constant delay with respect to $C_A$, set according to:

$$t_{r_n-trailing} = \frac{1}{f_s}\left(1 - \frac{1}{4-1}\right) = \frac{2}{3f_s}$$

Figure 7A:
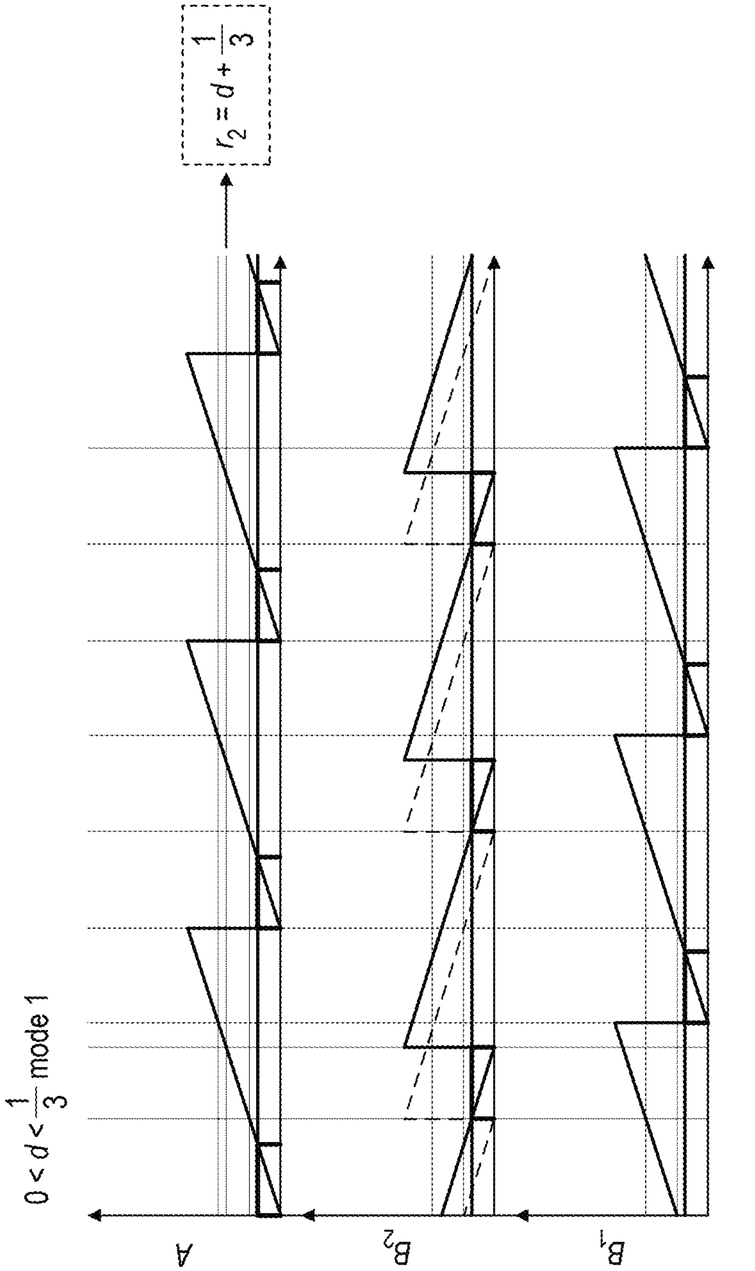
FIGS. 7A-7C show timings of carriers for an exemplary four-level converter.
Figure 7B:
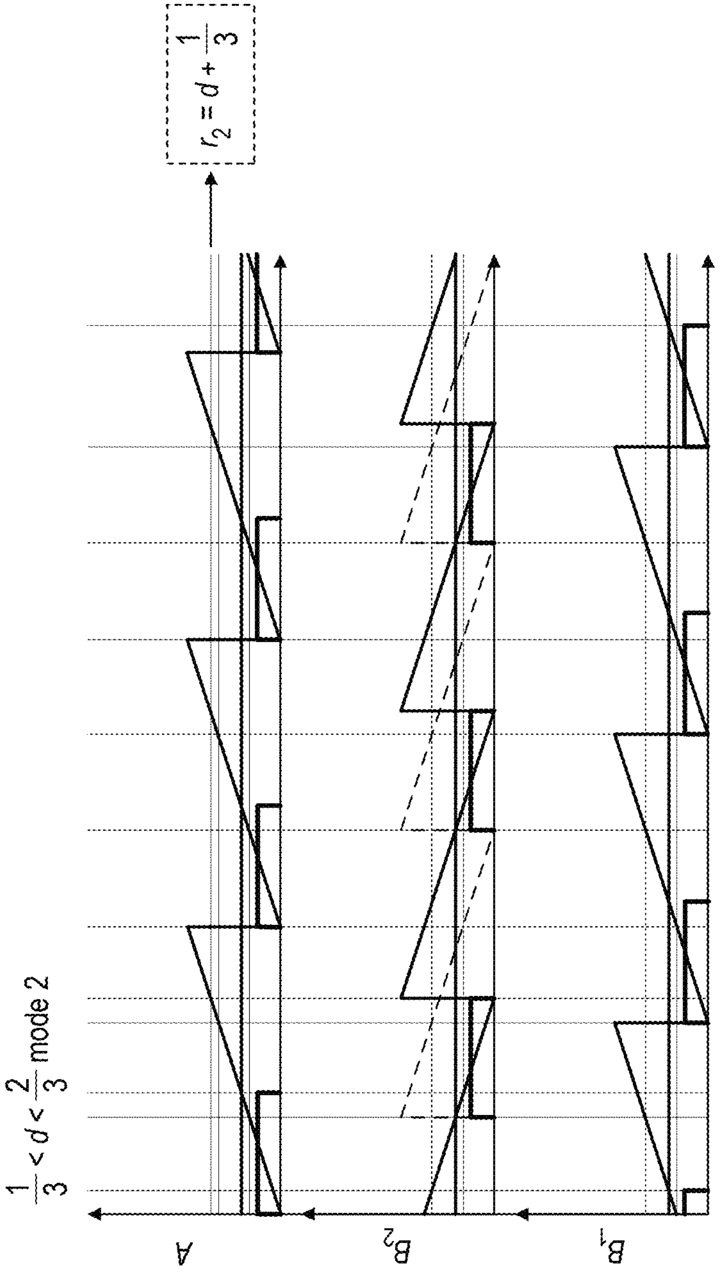
Figure 7C:
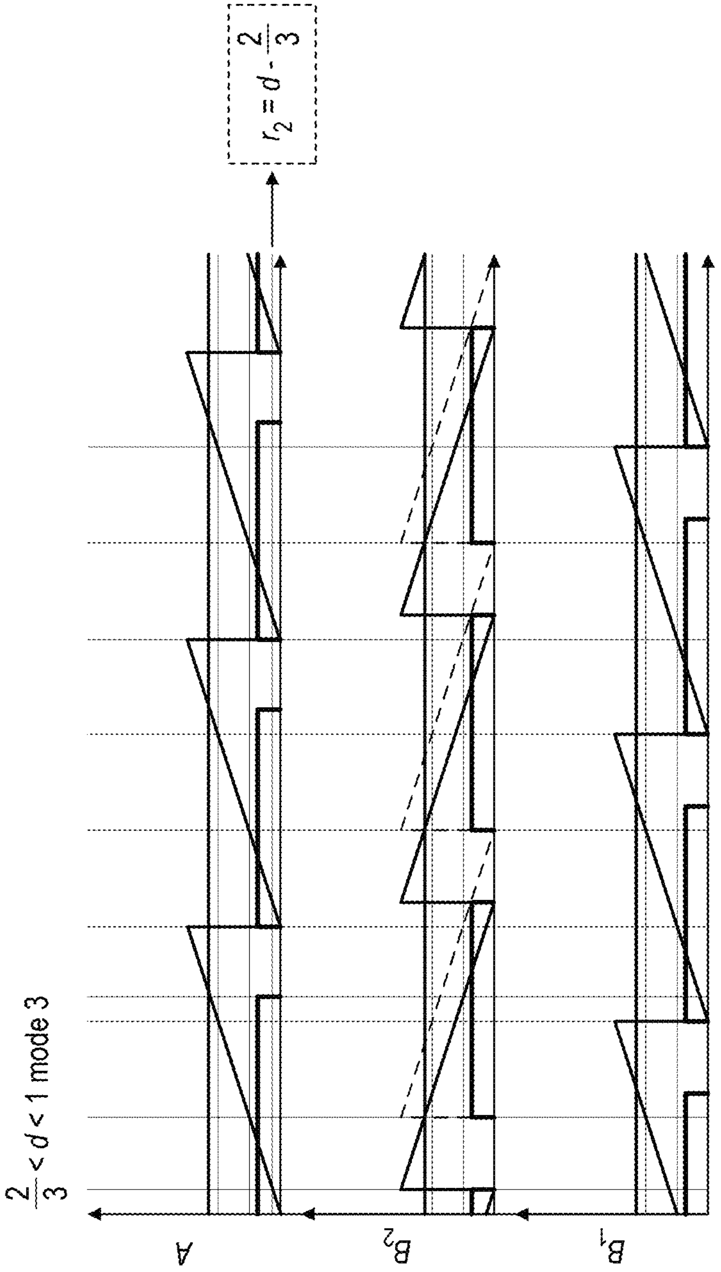
Figure 8A:
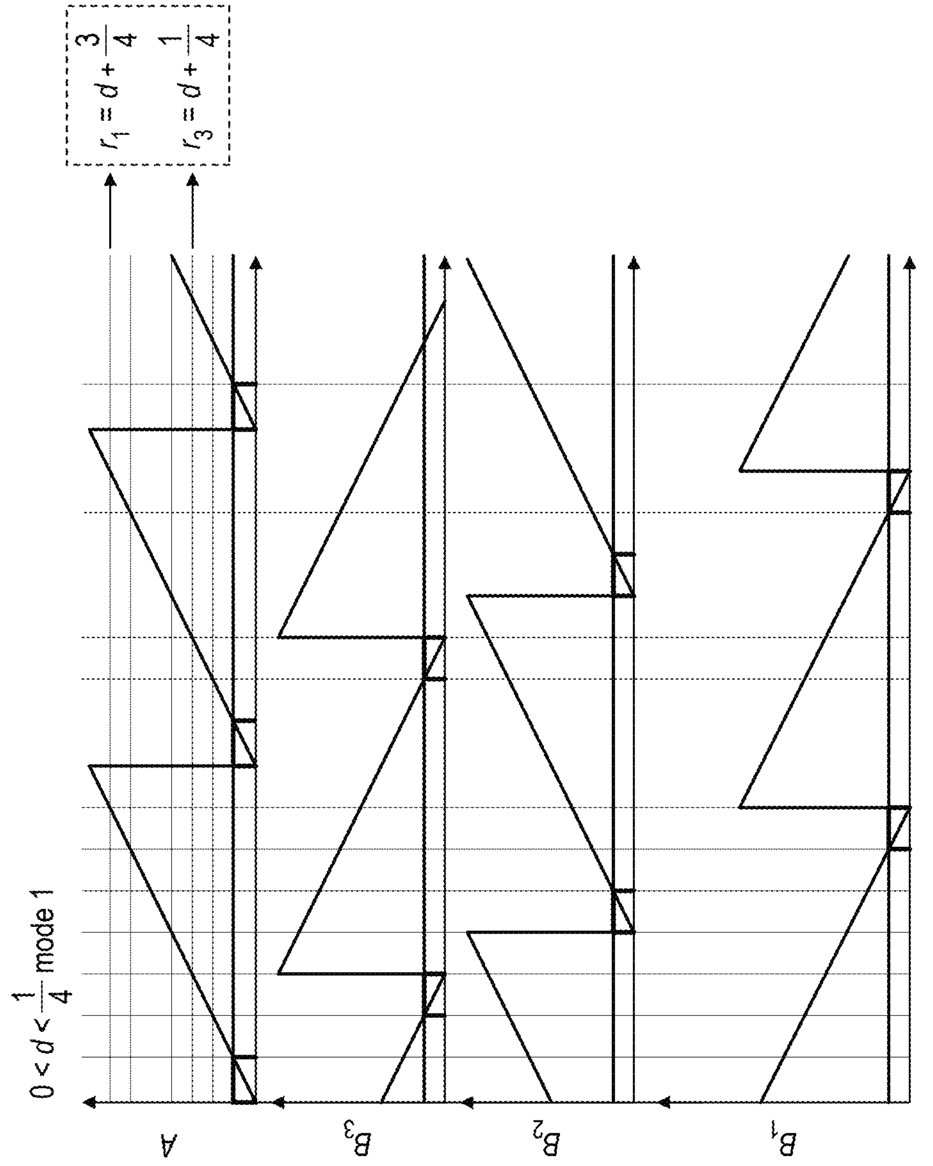
FIGS. 8A-8D show timings of carriers for an exemplary five-level converter.
Figure 8B:
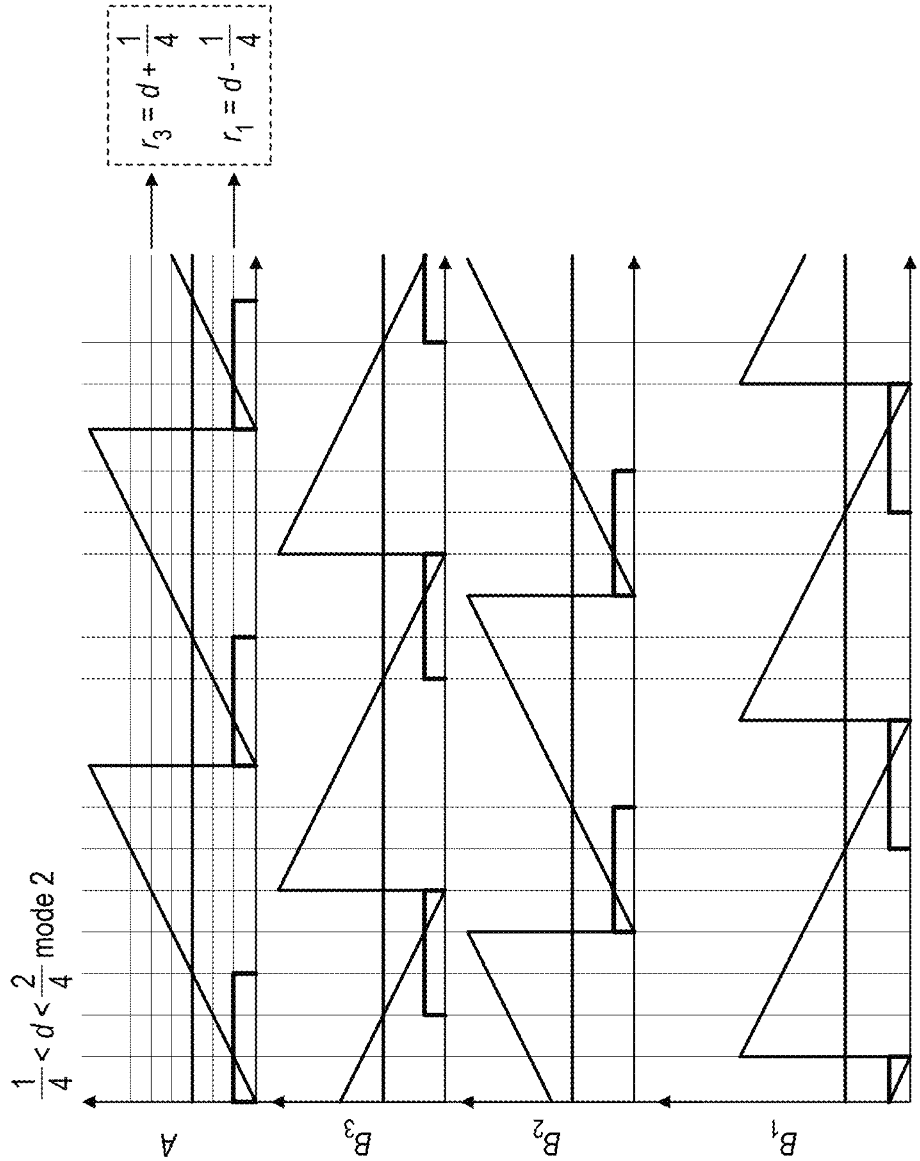
Figure 8C:
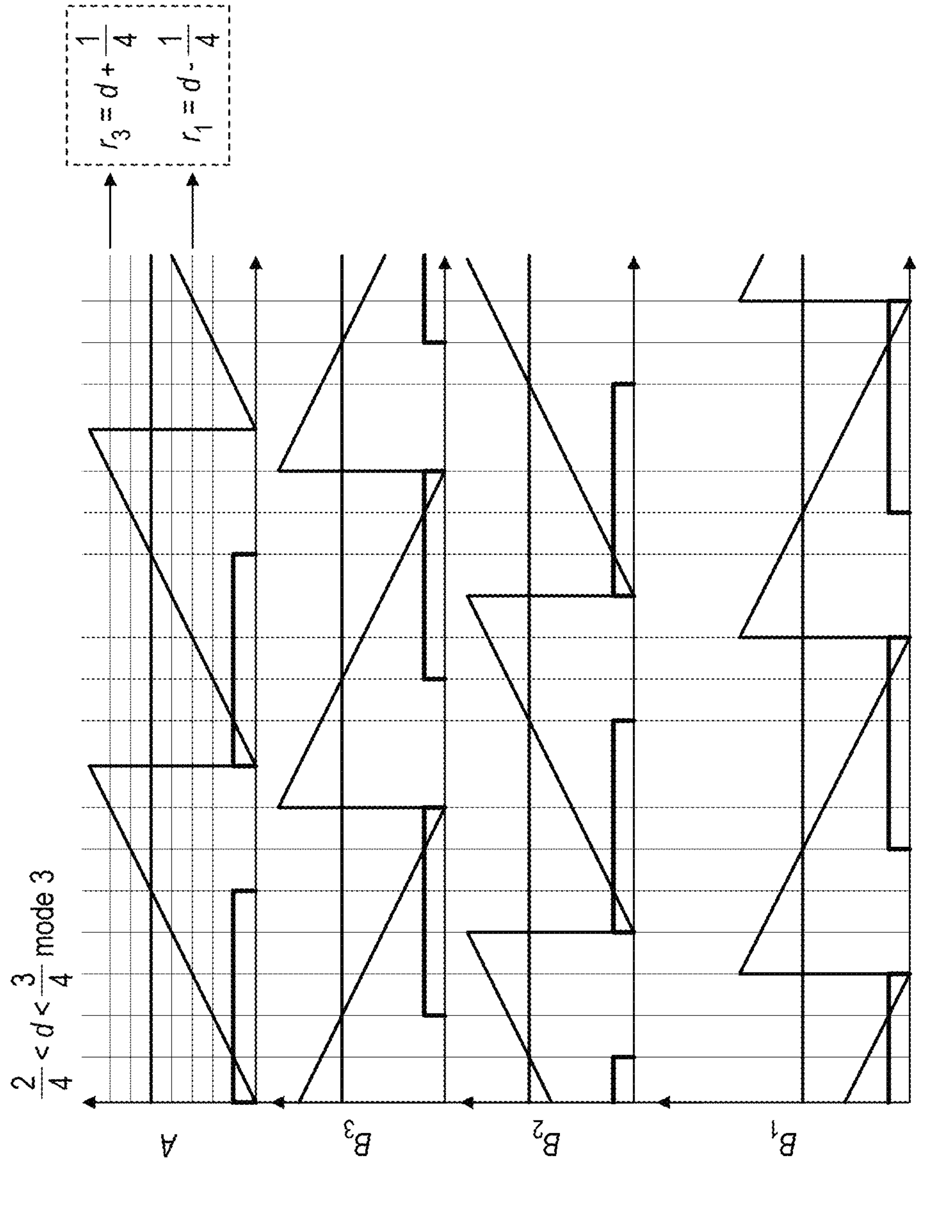
Figure 8D:
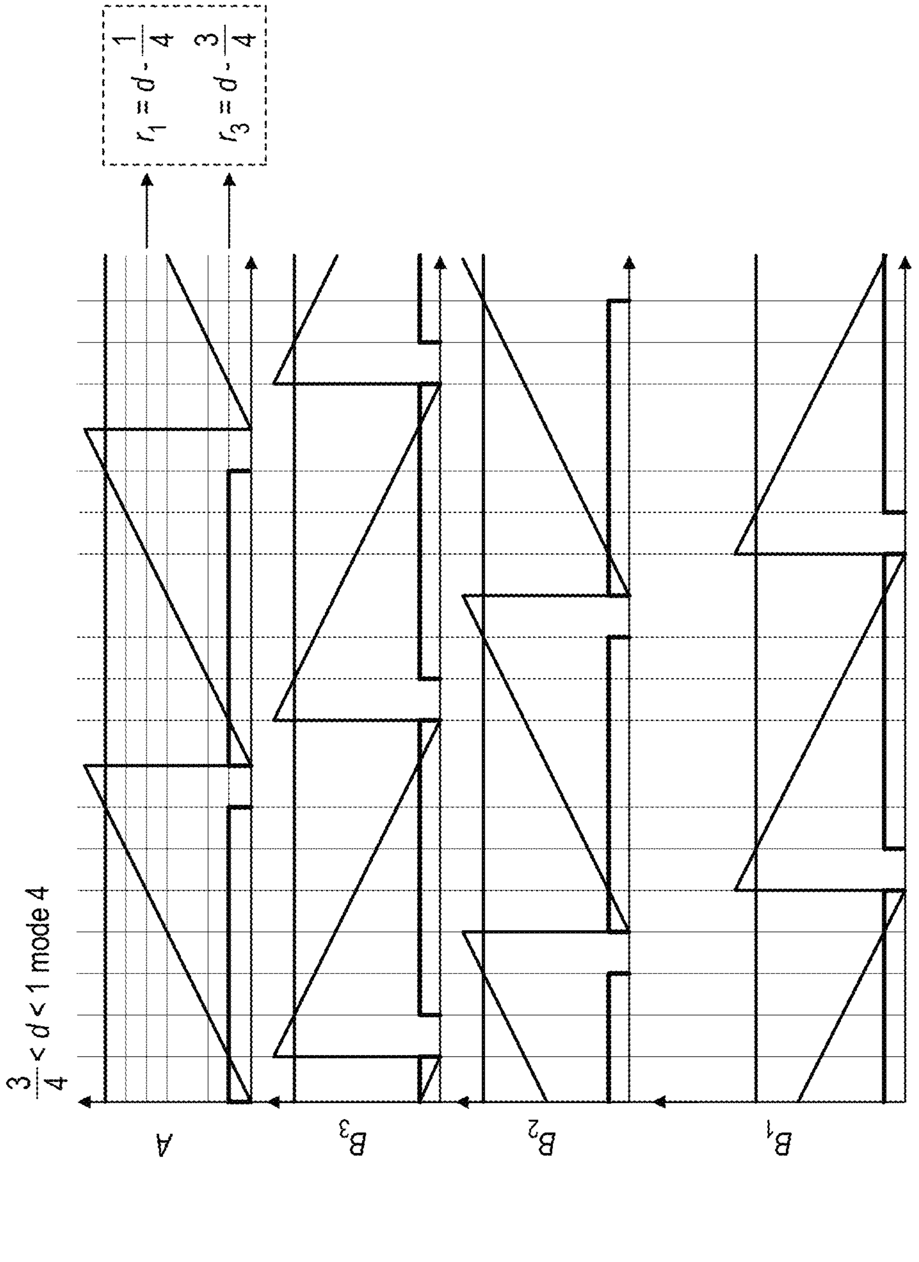

To generate the leading edge carrier $C_2$ for the intermediate pair of switching elements, the reference value $r_2 = t_{r_2} f_s$ is compared to the carrier $C_A$ and, at the compare match, the reset signal for the carrier $C_2$ is generated. As shown in FIGS. 7A, 7B, and 7C, respectively, in the first two operating modes $$r_2 = d + \frac{1}{3},$$

while $$r_2 = d - \frac{2}{3}$$

in the third operating mode, according to the equation that describes the delay time $t_{r_2\text{-}leading}$. Eventually, as shown, every two consecutive PWM signals have a time shift of $$\frac{1}{3f_s}$$

between them.

With N=5 levels, the converter has four carriers to generate the corresponding four PWM control signals. In this example, there are two trailing edge carriers $C_A$ and $C_2$, and two leading edge carriers $C_1$ and $C_3$. The trailing edge carrier $C_2$ is shifted in time by $t_{r_n\text{-}trailing}=0.5/f_s$. As shown in FIGS. 8A, 8B, 8C, and 8D, respectively, the reference $r_3$ in the first three operating modes is set equal to d+0.25, but in the last operating mode $r_3$=d=0.75. Meanwhile, the reference n=d+0.75 in only the first operating mode but is set equal to d−0.25 in the other operating modes. Again, as shown, by generating the reset signals for $C_1$ and $C_3$ at the compare match between $C_A$ and $r_1$ and $r_3$, respectively, the desired $$\frac{1}{4f_s}$$

interleaved time between the consecutive PWM signals can be achieved.

Figure 9:
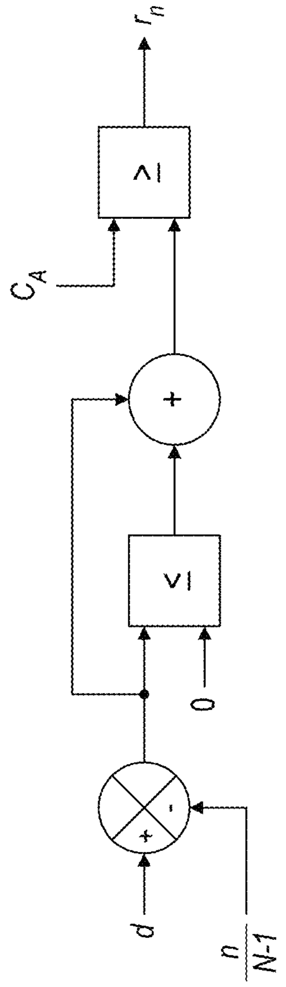
FIG. 9 is a block diagram illustrating a reset generator for generating timings suitable for the converters of FIGS. 6-9.

A block diagram of an exemplary generalised reset signal ($r_n$) generator is shown in FIG. 9. A constant value $$\frac{n}{N-1}$$

is subtracted from the original duty cycle command value d; the result is compared to zero; and the digital output value of the comparator is added to $$d - \frac{n}{N-1}.$$

The generated sum value will be either $$\left(d - \frac{n}{N-1}\right) \text{ or } \left(d+1-\frac{n}{N-1}\right),$$

depending on the value of the duty cycle and the corresponding operating mode of the converter. Therefore, the reset signal $r_n$ which is generated at the compare match between the carrier $C_A$ and the generated sum value will be shifted with the time $t_{r_n\text{-}leading}$. Here, it should be highlighted that either the original duty cycle command value d or any conditioned version of it may be used to implement the flying capacitor voltage control loop. The scope of the present disclosure is not limited to the direct usage of the duty cycle command value produced by the output voltage controller.

It should be noted that the above-mentioned embodiments illustrate rather than limit the invention, and that those skilled in the art will be able to design many alternative embodiments without departing from the scope of the appended claims.

For instance, in the examples above, the switching elements were shown as MOSFETs. This is of course not essential.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore in the appended claims lists comprising "at least one of: A; B; and C" should be interpreted as (A and/or B) and/or C.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The invention claimed is:

1. A method of balancing voltages of flying capacitors in a multilevel power converter, the multilevel power converter comprising a plurality of pairs of switching elements in a nested arrangement, including at least a first pair of switching elements and a second pair of switching elements, wherein the first pair of switching elements is an innermost pair, wherein the switching elements of the first pair are coupled together at a switching node, wherein the switching elements of the second pair are coupled to respective switching elements of the first pair, the multilevel power converter further comprising the flying capacitors, the flying capacitors including a first flying capacitor connected across the first pair of switching elements, the method comprising:

obtaining a duty cycle command value for driving the switching elements;

generating, based on the duty cycle command value, a first pulse width modulated, PWM (Pulse Width Modulation), control signal for the first pair of switching elements and a second PWM control signal for the second pair of switching elements, the first PWM control signal comprising a series of first pulses at a switching frequency and the second PWM control signal comprising a series of second pulses at the switching frequency, each pulse having a start and an end;

wherein a first switching element of the first pair is controlled by the first PWM control signal and a second switching element of the first pair is controlled by a complement PWM control signal of the first PWM control signal, wherein a first switching element of the second pair is controlled by the second PWM control signal and a second switching element of the second pair is controlled by a complement PWM control signal of the second PWM control signal;

detecting a difference between a voltage on the first flying capacitor and a reference voltage for the first flying capacitor; and responsive to detecting said difference, modifying a pulse width of the first pulses, the method further comprising: modifying a pulse width of the second pulses, wherein the pulse width of the first pulses is modified by changing a timing of an edge of each first pulse, and the pulse width of the second pulses is modified by changing a timing of an edge of each second pulse.

2. The method of claim 1, wherein the width of the first pulses is modified by changing a timing of a start of each first pulse, and the width of the second pulses is modified by changing a timing of an end of each second pulse, wherein, when modifying the width of the first pulses and the second pulses, a time interval between a start of a first pulse and an end of a second pulse is held constant.

3. The method of claim 1, wherein the width of the first pulses is modified by changing a timing of an end of each first pulse, and the width of the second pulses is modified by changing a timing of a start of each second pulse, wherein, when modifying the width of the first pulses and the second pulses, a time interval between the end of a first pulse and the start of a second pulse is held constant.

4. The method of claim 1, wherein the first PWM control signal is generated from a first carrier wave and the second PWM control signal is generated from a second carrier wave, wherein the first carrier wave is a ramp-up sawtooth function with a sharp trailing edge, and the second carrier wave is a ramp-down sawtooth function with a sharp leading edge.

5. The method of claim 4, wherein a timing of the first carrier wave is set based on a timing of a carrier wave for generating a PWM control signal for an outermost pair of switching elements among the plurality of pairs of switching elements.

6. The method of claim 1, wherein the multilevel power converter is configured for N levels, and the plurality of pairs of switching elements includes of N−1 pairs of switching elements, the method comprising generating a PWM control signal for each pair of switching elements based on a respective carrier wave comprising a sawtooth function, wherein the sawtooth functions alternate between ramp-up sawtooth functions and ramp-down sawtooth functions.

7. The method of claim 6, wherein a timing delay between the PWM control signals for consecutive pairs of switching elements is equal to $$\frac{1}{f_s(N-1)},$$

where $f_s$ is the switching frequency.

8. The method of claim 6, wherein a timing delay of a trailing edge of each ramp-up sawtooth function is set equal to:

$$t_{r_n-trailing} = \frac{1}{f_s}\left(1 - \frac{n}{N-1}\right)$$

where n is the index of the pair of switching elements.

9. The method of claim 6, wherein a timing delay of the leading edge of each ramp-down sawtooth function is set equal to:

$$t_{r_n-leading} = \begin{cases} \frac{1}{f_s}\left(d + 1 - \frac{n}{N-1}\right); & d \le \frac{n}{N-1} \\ \frac{1}{f_s}\left(d - \frac{n}{N-1}\right); & d > \frac{n}{N-1} \end{cases}$$

where n is the index of the pair of switching elements and d is the duty cycle command value.

10. The method of claim 6, wherein a leading edge or trailing edge of one carrier is triggered by another carrier reaching a threshold.

11. The method of claim 1, wherein the plurality of pairs of switching elements includes two pairs, wherein the second pair of switching elements is the outermost pair.

12. The method of claim 1, wherein the plurality of pairs of switching elements comprises three or more pairs, and the one or more flying capacitors further include a second flying capacitor connected across the second pair of switching elements, wherein the second pair of switching elements is the next-innermost pair after the first pair.

13. A controller for a multilevel flying capacitor power converter comprising a plurality of pairs of switching elements in a nested arrangement, including at least a first pair of switching elements and a second pair of switching elements, wherein the first pair is an innermost pair, wherein the switching elements of the first pair are coupled together at a switching node, wherein the switching elements of the second pair are coupled to respective switching elements of the first pair, the multilevel power converter further comprising one or more flying capacitors, including at least a first flying capacitor connected across the first pair of switching elements, the controller comprising:

first control logic configured to calculate a duty cycle command value for driving the switching elements; and second control logic configured to generate, based on the duty cycle command value, a first pulse width modulated, PWM, control signal for the first pair of switching elements and a second PWM control signal for the second pair of switching elements, the first PWM control signal comprising a series of first pulses at a switching frequency and the second PWM control signal comprising a series of second pulses at the switching frequency, each pulse having a start and an end, wherein a first switching element of the first pair is controlled by the first PWM control signal and a second switching element of the first pair is controlled by the complement of the first PWM control signal, wherein a first switching element of the second pair is controlled by the second PWM control signal and a second switching element of the second pair is controlled by the complement of the second PWM control signal, wherein the second control logic comprises voltage balancing logic configured to detect a difference between a voltage on the first flying capacitor and a reference voltage for that flying capacitor; and responsive to detecting said difference, to modify a width of the first pulses, wherein the voltage balancing logic is further configured to modify a width of the second pulses, wherein the width of the first pulses is modified by changing a timing of an edge of each first pulse, and the width of the second pulses is modified by changing a timing of an edge of each second pulse.

14. The controller of claim 13, wherein the voltage balancing logic is configured to modify the timing of each pulse by an amount that is proportional to the difference between the voltage on the first flying capacitor and the reference voltage for that flying capacitor.

15. Computer program code configured to cause a programmable controller for a multilevel power converter to perform the method of claim 1 during a condition in which the computer program code is executed on said programmable controller.

16. The controller of claim 1, wherein the width of the first pulses is modified by changing a timing of the start of each first pulse, and the width of the second pulses is modified by changing a timing of the end of each second pulse.

17. The control of claim 1, wherein the width of the first pulses is modified by changing a timing of the end of each first pulse, and the width of the second pulses is modified by changing a timing of the start of each second pulse.

18. An apparatus comprising:

a controller operative to:

receive a reference voltage;

receive a signal indicating a magnitude of a voltage across a flying capacitor disposed in a power converter, the power converter operative to convert an input voltage into an output voltage via control of current through an inductor; and based on comparison of the received signal to the reference voltage, adjust pulse width modulation control of a network of switches in the power converter to adjust the magnitude of the voltage across the flying capacitor.

19. The apparatus in claim 18, wherein the reference voltage is set to a proportion of the magnitude of the input voltage.

* * * * *